Patented Jan. 3, 1928.                                                                 1,654,564

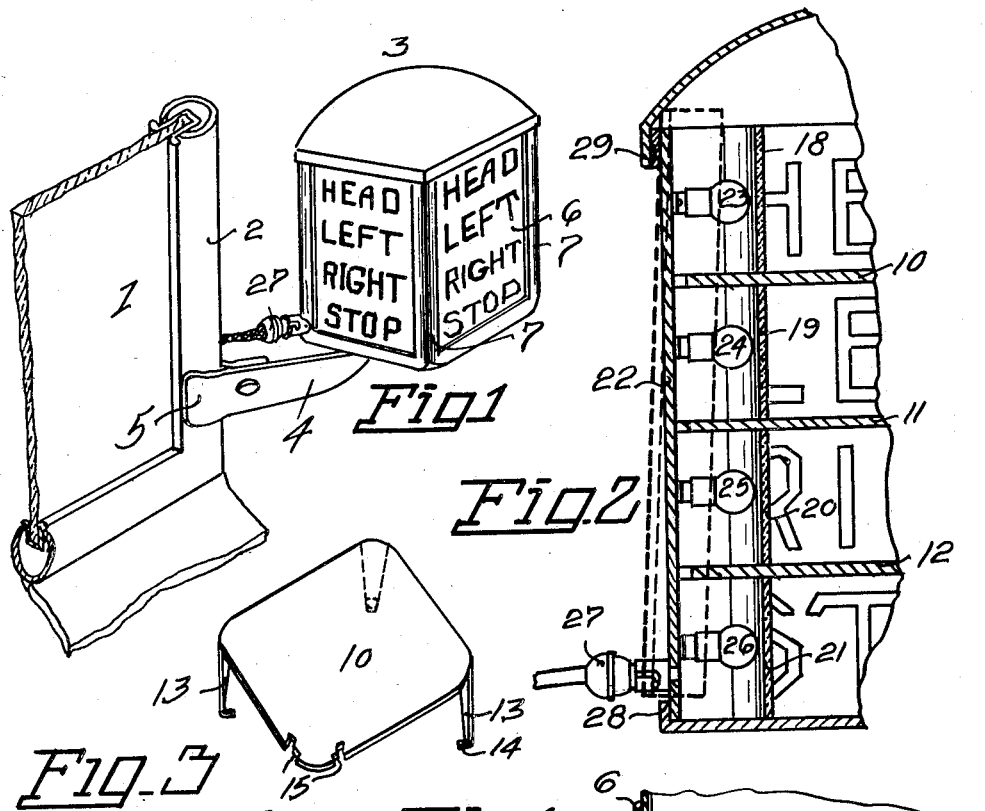
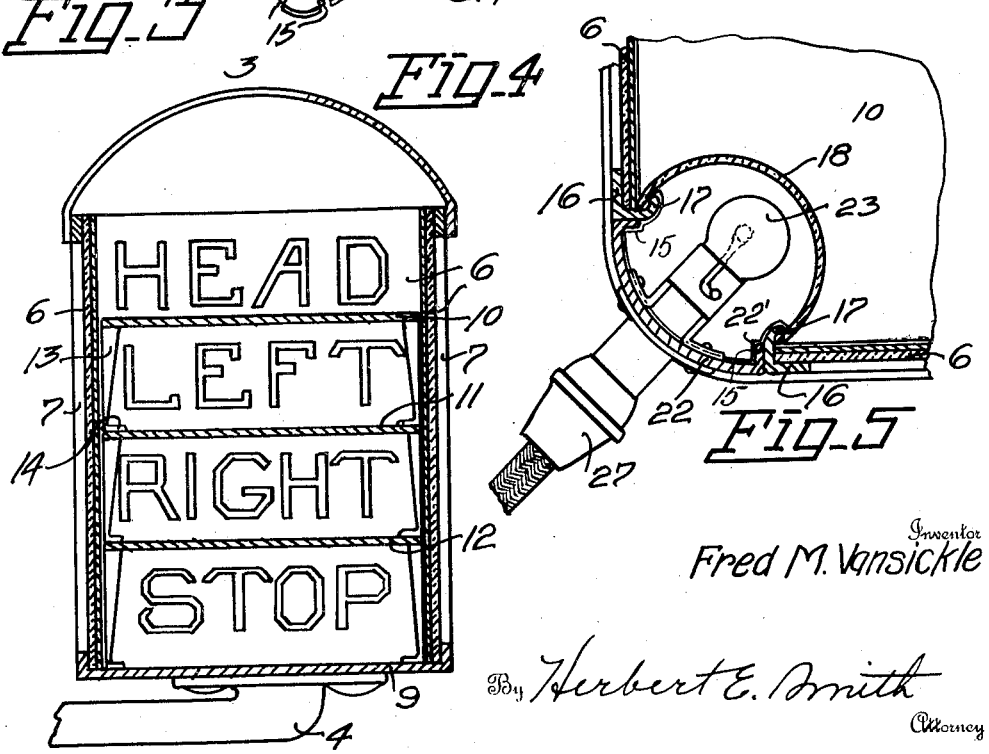

UNITED STATES PATENT OFFICE.

FRED M. VANSICKLE, OF CLACKAMAS, OREGON, ASSIGNOR OF ONE-HALF TO LESTER GUTCHES, OF CLACKAMAS, OREGON.

VEHICLE SIGNAL.

Application filed December 24, 1924.  Serial No. 757,894.

My present invention relates to improvements in vehicle signals for use on automotive vehicles and of the type involving a casing adapted to be illuminated for the purpose of indicating motion and direction of travel of the vehicle or automobile. The invention is embodied in the structure of a casing having several compartments and indications or signs and provided with means for illuminating a selected indicator or sign.

By the utilization of my invention I provide a lamp casing or structure which may with facility be attached to the windshield or other support of a vehicle and which embodies certain novel features and combinations and arrangements of parts whereby the device may be manufactured with facility at low cost. Means are provided whereby ready access may be had to the several lamps of the device when required for repair or adjustment, and the whole structure involves features which co-act to insure a reliable and efficient means for signaling the intention of a vehicle driver as to motion and direction.

In the accompanying drawings I have illustrated one complete example of the physical embodiment of my invention wherein the parts are combined and arranged according to the best mode I have thus far devised for the practical application of the principles of my invention.

Figure 1 is a perspective view showing a portion of an automobile windshield with the device of my invention attached thereto in operative position.

Figure 2 is an enlarged vertical sectional view at one corner of the rectangular casing showing the detachable lamps and their supporting panel, and a portion of the interior arrangement of the casing.

Figure 3 is a perspective view of one of the horizontal partitions of the casing used to form compartments therein.

Figure 4 is a vertical sectional view of the signal casing.

Figure 5 is an enlarged horizontal sectional view at one corner of the casing showing an illuminating lamp, its holder or supporting plate, and a colored glass plate surrounding the lamp.

In order that the general arrangement and relation of parts may readily be understood I have indicated in Figure 1 a portion of an automobile windshield at 1 with its support or post 2. The signal casing, which is of rectangular shape, is indicated as a whole by the numeral 3 and is supported from the post 2 by means of a bracket arm 4 and clamp device 5, in such position that the several signals as "Head" "Left" "Right" and "Stop" may be observed by pedestrians or motorists. These signals or indications for motion and direction are provided on the four sides of the casing and are visible by day and illuminated by night, in selective manner, as will be described.

The casing is provided with four glass panels or sides as 6 upon which the indications above referred to are carried, and these panels may be ground glass with transparent letters, or the letters may be ground glass with contrasting surrounding surfaces, or other distinguishing means may be employed for the signals or indications. The glass panels are retained in place by the use of three corner posts 7, and the casing has a removable top 8 and fixed bottom 9.

The interior of the casing is divided into four compartments corresponding to the four traffic indications, and for this purpose I utilize three horizontal partitions as 10, 11 and 12. These partitions are made up of metal stamped in the form of rectangular plates, preferably formed with rounded corners to engage the posts 7, and fashioned with legs 13 and feet 14 at three of the corners. The lowermost partition rests with its feet upon the bottom of the casing and the succeeding partitions have their feet resting upon the preceding partitions as indicated in Figure 3.

The partitions are removable and are successively deposited in the casing in their proper position, through the open top of the casing. As best seen in Figure 3 each partition at one corner is fashioned with a pair of spaced angularly disposed notches 15 instead of a leg and foot for co-action with specially formed features at one corner of the casing.

In Figure 5 this special formation is disclosed at one corner of the casing where a pair of spaced posts 16 are used, each having an inturned, vertical flange 17, and these posts extend from the bottom to the top of the casing. The notches 15 of the several partitions correspond with these flanges and engage over the edges of the flanges.

Between the partitions are arranged round glass plates as 18, 19, 20, and 21, preferably colored and retained in place by engagement of their free edges with the curved flanges 17 of the uprights 16.

In the open corner of the casing between the two spaced posts 16 a lamp holder 22 is carried. This holder is in the form of a rounded plate to conform to the rounded corners of posts 7 of the casing, and is fashioned with edge flanges 22' for frictional engagement with the posts 16 of the casing. In the lamp holder is carried a series of electric lamps as 23, 24, 25, and 26 spaced apart for location between adjoining partitions and the respective compartments at the top and bottom of the casing, and partly surrounded by the rounded glass plates 18 etc. Electrical connections 27 are provided for the lamps and current is supplied to the lamps in suitable manner.

The lamps are thus carried by a detachable holder or plate 22 which fits closely within the two posts 16 of the casing. The lower end of the holder is retained within a flange 28 projecting upwardly from the bottom 9 exterior of the casing, and the upper end of the holder is retained within a top flange 29 on the lower edge of the top 8. By dotted lines in Fig. 2 the manner of inserting the holder in position is illustrated where it will be seen that the upper end of the holder is slipped within the casing and above overhanging flange 29 to permit the lower end of the holder to be passed over the lower flange 28. Then the holder is forced down with its lower edge within the flange 28, and the flanges 22' of the holder are retained in close frictional contact with the flanges 17 of the posts 16 to secure the lamp holder in position.

The wires for the several lamps are distributed from the connection 27 up through the compartments to the respective lamps.

The lamps are of course selectively and independently controlled for the purpose of illuminating their respective indicators or signs, and the rays from an illumined lamp pass through the curved colored plate to illuminate a single compartment, as for instance the lowermost or Stop compartment. Thus when the lamp 26 is illuminated its rays pass through the rounded glass plate 21 which should be colored red, and the entire area of the compartment is illumined together with the four signs Stop as a signal or warning to pedestrains, motorists and others. The other compartments and indicators are similarly and selectively illumined.

By this construction and arrangement of parts it will be obvious that the several constituent elements of the casing may be manufactured in standardized production and the several parts assembled with accuracy and convenience, and when repairs or changes in parts are necessary, these repairs or changes may be made with equal facility because of the simplicity of construction of the device and the assembly of its parts.

Having thus fully described my invention what I claim as new and desire to secure by Letters Patent is—

1. The combination with a signal casing of a series of superimposed horizontally removable partitions therein forming compartments said casing having a pair of spaced upright posts forming an exterior vertical opening therein, a removable lamp holder adapted to close said opening, means for retaining said holder, and lamps carried by said holder, one of which is located in each compartment.

2. The combination with a signal casing of a series of removable partitions therein forming compartments, each said partition comprising a plate having spaced notches and supporting legs, a pair of spaced upright posts forming an opening in the casing, and vertical flanges on said posts for co-action with said notched plates, a lamp holder adapted to close the opening and having a lamp in each compartment, and retaining means for said lamp holder.

3. The combination with a signal casing, of a series of superimposed horizontally removable partitions forming compartments, each said partition comprising a plate having spaced notches and supporting legs, a pair of spaced upright posts forming an opening in the casing and vertical flanges on said posts for co-action with said notches, a removable lamp holder adapted to close said opening, retaining means for the holder, lamps carried by said holder one of which is located in each compartment, and a colored glass plate enclosing each lamp having its edges engaged by said vertical flanges.

4. The combination with a signal box, of a series of superimposed, horizontally removable partitions forming compartments, said partitions each having a corner with spaced notches and spaced supporting legs at other portions thereof, a pair of spaced posts forming an opening in the box, a lamp holder for closing said opening and retaining means therefor, lamps carried by said holder one of which is located in each compartment, flanges on the posts for engagement with said notches, and a colored glass plate enclosing each lamp and serving to properly space the superimposed partitions at their otherwise unsupported corners.

In testimony whereof I affix my signature.

FRED M. VANSICKLE.